Nov. 27, 1928.   1,693,550

T. C. DELAVAL-CROW

METHOD OF MAKING BEARING SEPARATORS

Filed March 13, 1923

INVENTOR:
Thomas C. Delaval-Crow,
BY
HIS ATTORNEY.

Patented Nov. 27, 1928.

1,693,550

UNITED STATES PATENT OFFICE.

THOMAS C. DELAVAL-CROW, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

METHOD OF MAKING BEARING SEPARATORS.

Application filed March 13, 1923. Serial No. 624,705.

This invention relates to bearings and is herein shown as embodied in a separator for ball bearings and in a method of making the same.

Prior to this invention, separators have commonly been formed with ball confining pockets which either engage the balls of a circular series inside of the ball equators or on both sides of the equators. The ball subjected to the most load, not being able to slip, rotates fastest and engaging the forward edge of its pocket, tends to lift the separator towards the ball equator. This lifting, although it may be slight, tends to jam the separator pocket over the ball and creates too much friction and wear. The ball under load also drives the separator forward and there is also a tendency to spread the sides of the separator as when it is made of two connected rings having portions curved in between the balls. Separators which confine the balls against removal require a manufacturing operation after the balls are in place and cannot be finished without the balls.

An object of this invention is to provide an improved method of making bearing and separator which will have long life and avoid the above and other deficiencies. As one feature of the invention, the separator is made of a single ring of such diameter that it lies wholly outside the ball equators (considering the points in contact with the raceways as the poles) and has ball openings which are smaller than the balls to leave the latter free for inward radial movement towards the center of the bearing. Hence, any lifting action of a ball under load will not tend to jam the separator on the ball but will tend to lift it away from the ball. Furthermore, the balls opposite those under load may be free to move, in a very small degree, radially inward and their freedom from confinement enables them to be assembled in an angular contact bearing without a manufacturing operation on the separator after the balls are in place. To give life to the separator, the rims of the ball openings are extruded or pressed outwardly as spherical surfaces which take and distribute the pressure of the balls.

Another object of the invention is to provide a simple and efficient method of making the separator. To this end, a convex ring is pressed out of sheet metal by any suitable instrument, ball openings are cut in this ring and the metal is extruded around the rims of the openings by balls of a size preferably slightly larger than the balls of the bearing to effect clearance.

These and other objects, features and advantages of the invention will appear from a consideration of the following specification and accompanying drawings in which.

Figure 4:
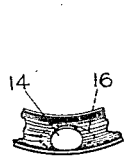
Fig. 4 is a fragmentary view of the separator ring with a ball opening cut in it before the metal at the opening is extruded.

In the drawings, the separator 10 is in the form of a single ring generally convex in cross-section and having a stiffening flange 12 extending inwardly from one or both of the edges. The ring is preferably stamped out of sheet metal. Oblong openings such as 14 (see Fig. 4) are punched in the ring 10 and the material within the circle indicated by dotted line 16 is then extruded as by forcing a ball 18, of a size preferably slightly larger than the balls of the bearing, radially outward against the metal at the rim of the opening. Preferably the shorter dimension of the opening 14 extends in the direction of the periphery of the ring and the metal is extruded at the narrower sides of the opening in the form of spherical projections 20 conforming to the surface of the ball 22. The slight excess of size in ball 18 over the ball 22 gives a small amount of clearance, insuring entry of the balls into the pockets and avoiding any jamming or wedging action.

Figure 1:
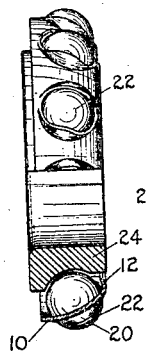
Fig. 1 is an end elevation and half section of an angular contact bearing (without the outer cup) embodying the improved separator.
Figure 2:
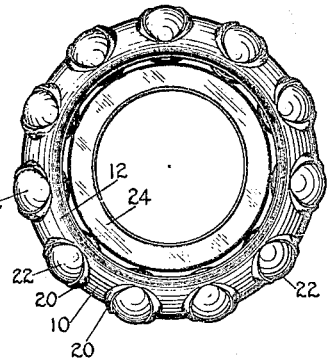
Fig. 2 is a front elevation.
Figure 3:
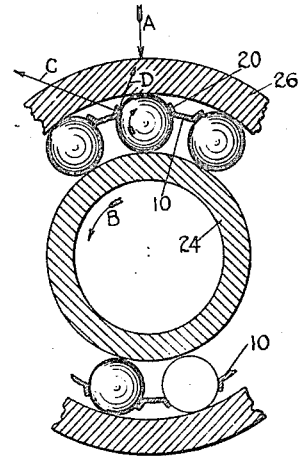
Fig. 3 is a sectional view.

As indicated in Fig. 3 the ring 10 is of a diameter greater than that of the circle passing through the centers of the series of balls and the ball openings in the ring are smaller than the balls, thus leaving the latter free, as far as the separator is concerned, for inward radial movement towards the center of the bearing. Assuming that the cone 24 is rotating in the direction of the arrow B (Fig. 3) and that the load on the cup is represented by the arrow A, the ball immediately subjected to the load, not having any slip, rotates faster than any of the others and in a direction opposite to cone 24. It therefore moves against the forward edge of its pocket and the pressure of the ball against the surface 20 tends to push the separator forward and to lift it somewhat, as indicated by the arrow C and friction also tends to lift the separator as indicated by arrow D. The tendency to lift the separator frees the ball against any jamming action such as would occur if the separator lay below the ball equator or confined the ball. Those balls opposite the ball subjected to load may be slightly out of contact with the cone 24 and the driven separator contacting with these balls tends to drive them. The balls being free to move radially towards the center of the bearing will not have any tendency to jam in the pockets of the separator. The large surface contact between the balls and the separator distributes the pressure and increases the life of the bearing. The forward pressure of the ball on the curved surfaces has also the usual tendency to spread the separator laterally but due to the integral construction of the separator, no harmful result is produced. The balls being unconfined in the seperator, no manufacturing operation on the separator is required after the balls are assembled and the separator can be finished without assembling or using the balls. The balls and separator however can be readily assembled with the inner cone and outer cup of an angular contact bearing when the parts are finished. When used in a double row bearing, two separators with their balls are employed.

Figure 5:
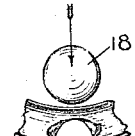
Fig. 5 is a similar view indicating the step of extruding the metal.
Figure 6:
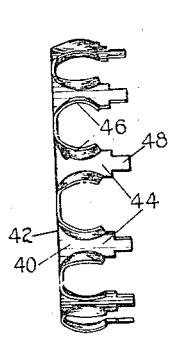
Fig. 6 is an end elevation of a two part separator.
Figure 7:
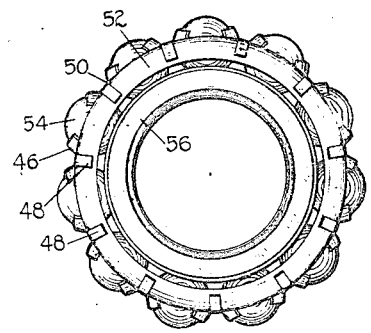
Fig. 7 is a front elevation of the same.

In the construction shown in Fig. 6, the separator 40 comprises a flange or ring 42 having arms 44 projecting at substantially right angles. The front and rear sides of the arms are provided with integral spherical projections 46 which may be pressed outwardly by a ball in a manner similar to that described above with reference to Figs. 4 and 5. Each arm 44 has a reduced extension or tongue 48 of a size to fit within a notch 50 in a second flange or ring 52 forming one side of the separator. The tongues 48 are bent into the notches and hold the parts of the separator against spreading. As in the other form, the separator pockets engage the balls 54 wholly outside of their equators so that the balls are free to move inwardly towards the cone 56.

Although the invention has been shown and described by reference to a specific construction and to certain steps, it should be understood that it is not necessarily limited in its broader aspects to the particular construction and steps selected for illustration.

I claim:

1. That improvement in the method of making separators for balls of a ball bearing which consists in pressing a ring out of sheet metal, and utilizing balls slightly larger than those of the bearing for pressing spherical bearing surfaces into the ring to engage the bearing balls in use.

2. That improvement in the method of making separators for balls of a ball bearing which consists in pressing a ring out of sheet metal, cutting openings in the ring and utilizing balls slightly larger than the bearing balls to force the metal at the rims of the opening outwardly away from the center of the bearing.

3. That improvement in the method of making separators for bearings which consists in pressing a ring from sheet metal, cutting rounded openings in the ring, the openings having one dimension longer than the other, one of the dimensions extending peripherally of the ring and the other extending transversely, and pressing the metal at the narrower portions of the openings outwardly in arcuate form away from the center of the bearing.

In testimony whereof I hereunto affix my signature.

THOMAS C. DELAVAL-CROW.